United States Patent
Hugenberg et al.

(10) Patent No.: US 6,714,545 B1
(45) Date of Patent: Mar. 30, 2004

(54) VDSL DATA NETWORK, SERVICE AND MANAGEMENT ARCHITECTURE

(75) Inventors: Keith F. Hugenberg, Westminister, CO (US); Naini K. Ahluwalia, Lyons, CO (US); Gregory L. Kissler, Golden, CO (US); Bradley D. Hultine, Littleton, CO (US); F. Craig Fisher, Thornton, CO (US); Steven R. Tow, Littleton, CO (US); David R. Setzke, Boulder, CO (US); James A. Huffman, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/519,399

(22) Filed: Mar. 3, 2000

(51) Int. Cl.[7] .............................................. H04L 12/56
(52) U.S. Cl. .............................. 370/395.1; 370/395.5; 370/466
(58) Field of Search .............................. 370/395.1, 397, 370/399, 395.5, 395.52, 485, 486, 466; 725/144, 138

(56) References Cited

U.S. PATENT DOCUMENTS

| | | | | |
|---|---|---|---|---|
| 5,805,165 A | * | 9/1998 | Thorne, III et al. | 345/348 |
| 5,864,537 A | * | 1/1999 | Hijikata et al. | 370/235 |
| 5,987,524 A | * | 11/1999 | Yoshida et al. | 709/245 |
| 6,104,700 A | * | 8/2000 | Haddock et al. | 370/235 |
| 6,154,772 A | * | 11/2000 | Duinn et al. | 709/217 |
| 6,195,364 B1 | * | 2/2001 | Brodigan | 370/463 |
| 6,304,578 B1 | * | 10/2001 | Fluss | 370/413 |
| 6,393,478 B1 | * | 5/2002 | Bahlmann | 709/224 |
| 6,467,090 B1 | * | 10/2002 | Brodigan | 725/87 |
| 6,473,427 B1 | * | 10/2002 | Brodigan | 370/395 |
| 6,530,086 B1 | * | 3/2003 | Brodigan | 725/95 |
| 6,542,266 B1 | * | 4/2003 | Phillips et al. | 359/118 |

OTHER PUBLICATIONS

Thomas Starr, John M. Cioffi, Peter Silverman; Understanding Digital Subscriber Line Technology; 1999 Prentice Hall PTR, Upper Saddle River, NJ; pp. 403–408.

* cited by examiner

*Primary Examiner*—Kenneth Vanderpuye
(74) *Attorney, Agent, or Firm*—Brooks Kushman P.C.

(57) ABSTRACT

A VDSL based broadband data communication network system is provided that utilizes ATM/IP all the way to an end user PC, thereby allowing selectable bit rate delivery to the end users, with a Class of Service (COS) and Quality of Service (QOS) selection. A headend is connected to external Internet service providers and a network central office, and is arranged to receive and send multi-protocol signals to the Internet service provider, and receive and send ATM signals to the central office. This VDSL data architecture is very functional and flexible with the capability of supporting such services as streaming video and audio, voice over IP, digital advertisements, videoconferencing, gaming, business-to-business service, E-commerce, video-on-demand, and interactive TV. The VDSL data network will support very high-speed two-way data services over fiber optics using SONET, Dense Wavelength Division Multiplexing, IP, ATM, and other transport systems. Furthermore, the VDSL data architecture also supports very high-bandwidth multimedia interactive applications for delivery to businesses, homes, or Multiple Dwelling Units using either Fiber-to-the-Node (FTTN), Fiber-to-the-Curb (or Neighborhood) (FTTC), and Fiber-to-the-Home (FTTH) using VDSL technology.

18 Claims, 4 Drawing Sheets

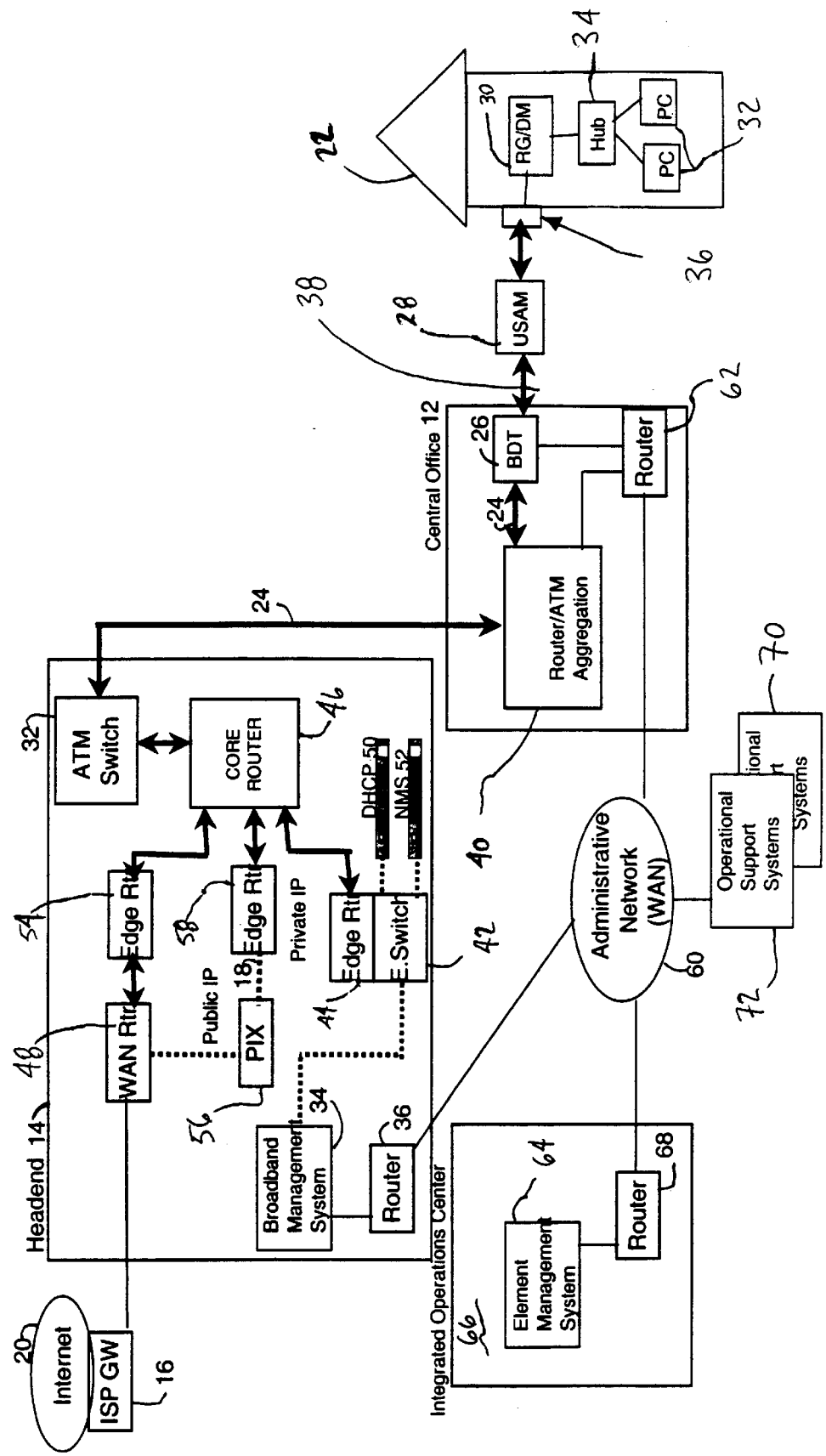

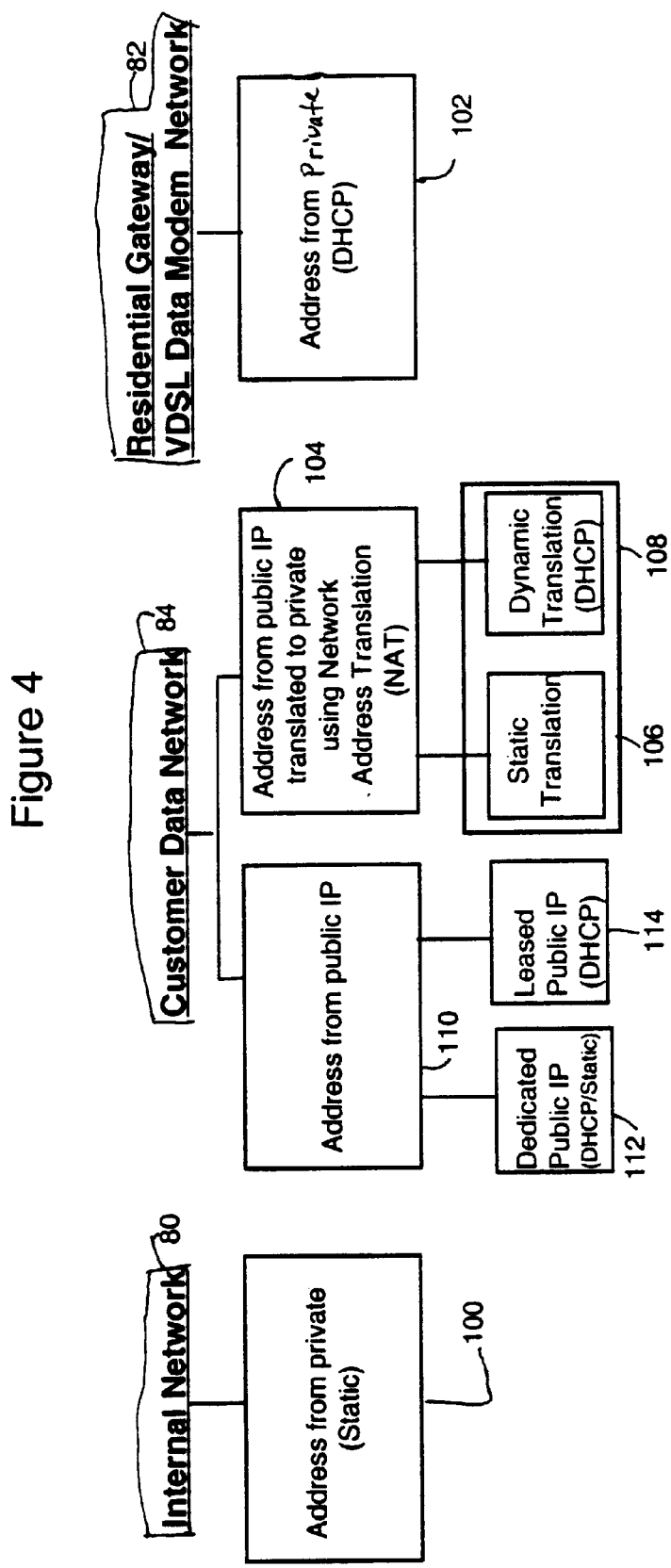

VDSL DATA NETWORK, SERVICE AND MANAGEMENT ARCHITECTURE

TECHNICAL FIELD

The present invention generally relates to VDSL based communication networks, and more particularly to an improved data service and administrative architecture capable of allowing high bandwidth Internet services to end customers, while also providing a way of accommodating increasing demand for IP address assignments.

BACKGROUND ART

VDSL (Very high speed Digital Subscriber Line) is a packet-based transmission architecture used to provide extremely high bandwidth distribution of digital video and data signals as well as telephony to customer locations. A VDSL-based architecture can advantageously provide a single platform for supporting bandwidth-intensive applications, such as Internet access, remote LAN access, video conferencing, television programming, and video-on-demand.

VDSL services are typically implemented in an asymmetric form, although symmetric services are also possible. A typical distribution network includes a central office equipped with a Broadband Digital Terminal (BDT) and arranged to operate as a hub between multiple video information providers (VIPs)/digital service providers (DSPs) and customer sites. In a fiber-to-the-neighborhood (FTTN) type distribution network, fiber optic links are used to connect the central office BDT to a universal service access multiplexer (USAM), which is then connected to a network interface device (NID) located on the customer property via twisted pair copper wire. A dedicated VDSL loop extends between the NID and a customer interface device, such as a residential gateway (RG), set top box (STB), or data only VDSL modem (DM) to provide a connection point for a customer television and/or personal computer. A fiber-to-the-curb (FTTC) type distribution network is similar except that a broadband network unit (BNU) is used in place of the USAM, and coaxial cable is used to connect the BNU, NID, and RG/DM.

In any data service system, the ability to provide a secure and efficient transport of data over the network is of a primary concern. However, to date, known data service systems have not proven wholly satisfactory. For example, known systems typically employ a shared Ethernet (10 Mb/s) across 400 to 500 homes, and are arranged to provide continual service with no usage charge. However, because shared Ethernet arrangements are always "on" from a user perspective, such arrangements are susceptible to unauthorized access by packet sniffers and hackers. As such, these systems are not particularly suitable for business service. Cable modems have not proven wholly satisfactory either. In addition, neither arrangement can provide a data distribution architecture capable of supporting different levels of service based on speed. Therefore, a need exists for a VDSL based data and administrative architecture capable of overcoming these problems in an economical manner.

In addition, each Personal Computer (PC) and each RG connected to a data network needs a unique IP address. Such addresses are of limited number. Thus, as the number of PCs and RGs grow, a need exists for an efficient IP addressing scheme that can compensate for the number of PCs and RGs exceeding the number of available IP addresses assigned by an upstream Internet Service Provider (ISP).

DISCLOSURE OF INVENTION

Therefore, it is an object of the present invention to provide a VDSL data and administrative architecture and method capable of allowing selectable bit rate delivery to end customers.

It is another object of the present invention to provide a VDSL data and administrative architecture and method that provide a secure transmission for supporting business communications, residential communications, and multiple dwelling unit (MDU) communications while still delivering a selectable bit rate service.

It is yet another object of the present invention to provide a VDSL data and administrative architecture and method that can accommodate increasing demand for IP address assignments.

It is yet another object of the present invention to provide a data architecture that is flexible in supporting new customers on demand with the purpose of pre-provisioning the services ahead of time.

It is yet another object of the present invention to provide a scaleable VDSL network architecture design that can expand to provide service to any number of customers.

It is yet another object of the present invention to provide a VDSL platform that supports Quality of Service (QOS) and Class of Service (COS) at either or both an IP and/or ATM layers and multi-protocol support over ATM.

It is yet another object of the present invention to provide a VDSL platform that is easily managed in either a centralized or distributed environment.

It is yet another object of the present invention to provide a functional and flexible architecture for supporting streaming video and audio, voice over IP, and other uses for a data service delivery platform.

It is yet another object of the present invention to provide an architecture that supports multi-protocol over ATM using either Permanent Virtual Circuits (PVCs) or Switched Virtual Circuits (SVCs). This will provide the added benefit that virtual circuits (VCs) can be terminated locally at the wire center or remotely.

In accordance with these and other objects, the present invention provides a VDSL based broadband data communication network system capable of allowing selectable bit rate delivery to end users. The system includes a central office BDT connected to a USAM or BNU that communicate ATM signals to a plurality of end user RG/DM's, and a headend connected to an external Internet service provider and the central office. The headend is arranged to receive and send IP signals to the Internet service provider, and receive and send ATM signals to the central office. The headend further includes a translation element arranged to translate a public IP address assigned to the VDSL network into a private network address assigned to a particular user PC terminal.

In accordance with another aspect of the present invention, a method of assigning IP addresses to end user PCs in a VDSL based broadband communication network includes assigning a private network IP address to all network elements in a network headend. Private network IP addresses are assigned to residential gateways to enable Pay-Per-View services, and the end user PCs are assigned a private network IP address selected from a pool of private network IP addresses as a default procedure. Public IP addresses are selectively assigned to end user PCs that can not be properly served using a private network IP address.

Thus, the present invention advantageously provides a data service network that utilizes ATM/IP data to the end user. By employing both private and public IP addresses, the ATM design of the present invention offers a secure transmission service, thereby facilitating use for business service. In addition, the ATM to the end user also allows the VDSL system of the present invention to support selectable bit rate service. Thus, the present invention can support tiered services based on transfer speed and IP addressing. In addition, the selective use of both public and private IP addresses allows the network to accommodate increasing demand for IP address assignments.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a block diagram of an administrative architecture and headend in accordance with the present invention; and FIG. 4 is a flowchart of the overall method of assigning IP addresses in accordance with the present invention.

BEST MODE FOR CARRYING OUT THE INVENTION

Figure 1:
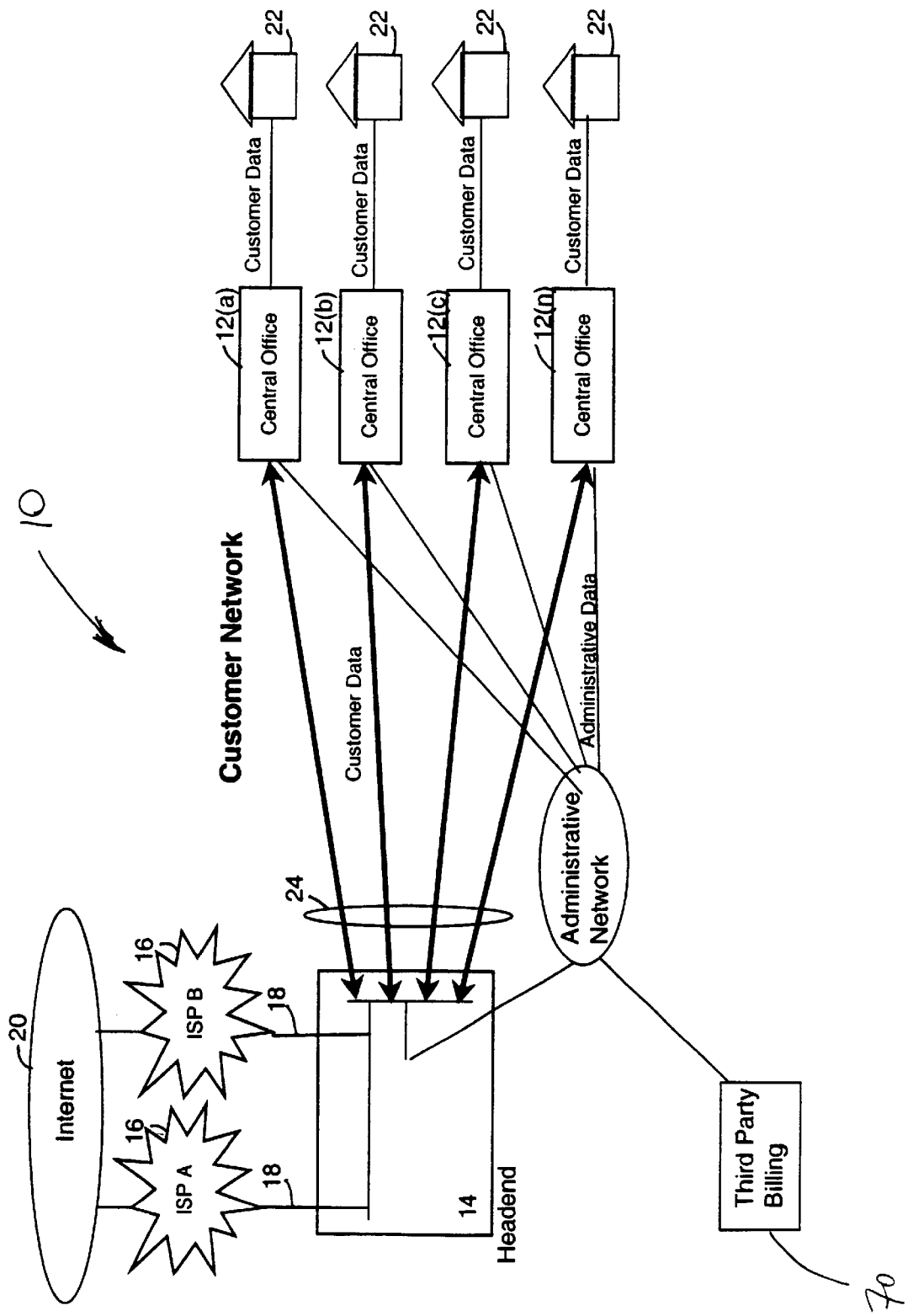
FIG. 1 is a block diagram of a VDSL-based data distribution communication network in accordance with an exemplary embodiment of the present invention.
Figure 2:
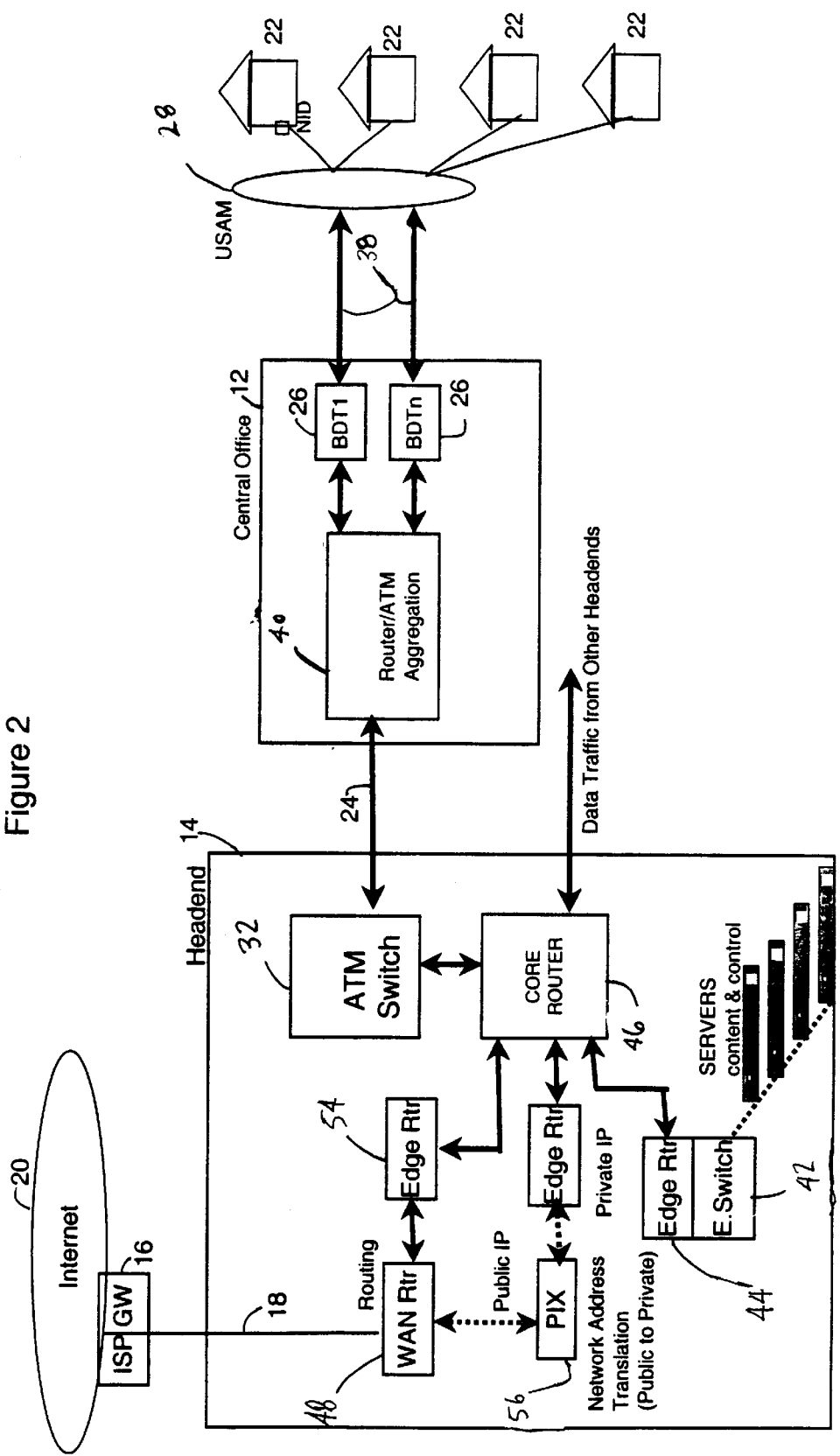
FIG. 2 is a block diagram of a data architecture that provides IP over ATM to the end user terminal in accordance with the present invention.

Referring to FIGS. 1–3, a VDSL communication network in accordance with an exemplary embodiment of the present invention is generally indicated at 10 and includes at least one central office (CO) 12(a)–(n) connected to a headend facility 14. The headend facility connects to one or more Internet service providers (ISP) 16 (two are shown as ISP A and ISP B, but there is no limitation to the possible number of ISPs) via a wireline link 18 such as a suitable Private Internet Exchange (PIX) hub connection. The headend is arranged to operate as a network hub for communication of data signals between the Internet 20 or other corporate LAN and one or more user sites 22. Each CO 12 provides a bridge to the respective end users.

In accordance with the present invention, the combined signals are transmitted using an asynchronous transfer mode (ATM) protocol. As an example, one may use multiple protocol support over ATM.

Each CO includes a BDT 26 that is coupled to at least one USAM 28 or BNU located near an end user site via optic cable 24. As noted previously, a USAM is used in a FTTN type network configuration, while a BNU is used in a FTTC type network configuration. The USAM or BNU are arranged to operate as a single platform for voice, video, and data signals as is understood in the art. A residential gateway (RG) is arranged to separate the voice, data and video signals into output signals for use with end user video equipment (not shown), telephones (not shown), and personal computers.

The present invention data architectural flow describes the signal flow from the customer's computer to the Internet or other data network services. As best seen in FIG. 3, PCs at the customer site are connected to the VDSL data network through a standard Ethernet Network Interface Card (NIC) not shown, and to a RG or Data Modem (DM)(RG/DM) 30 using standard Ethernet wiring. The computer obtains an IP address either from a static assignment or through a DHCP server 50, as described below.

The RG/DM can support a single computer 32 or an entire local area network depending upon the subscribed service package. The PCs or network connect to the RG/DM via a suitable Ethernet hub 34. Regarding the DM, both voice and data signals are combined where as with the RG, a video signal is included with the voice and data signals. At the RG/DM the signals are converted from their native protocol to ATM streams for transport to the serving Central Office 12. The broadband network located on the side of the end user building or residence typically includes a network interface device (NID) 36. The RG/DM connects to the Network Interface Device (NID) which designates the demarcation point between the customer's home network and the service provider's network. The connection from the NID to the customer's RG/DM can be either standard telephone wire, coaxial cable or wireless.

The NID includes a filter for separating the telephony services from the broadband services, i.e., video and data services. The telephony services will use existing telephony wiring while the broadband services are sent to the input of the RG. The RG can be arranged to support three video outputs and a high speed data output. However, this is not to be construed as limiting. The RG recovers the IP content from the ATM transport, decodes it, and delivers it to the connected PCs such as through Ethernet hub 34.

From the NID, the connection continues to the USAM (or BNU) using VDSL encoding over either standard telephone wiring or coaxial cable. Alternatively, a wireless connection could be employed. The selection of the transport technology connecting the NID to the USAM is dependent upon parameters specific to the locality of the deployed system.

The USAM is arranged to perform media conversion and aggregation. Media conversion takes the incoming signals from each of the customers connected to a particular USAM, and converts these mixed medium signals for transmission over a single optical fiber 38. This optical fiber connects the USAM to a BDT located in the Central Office. Each USAM is arranged to aggregate a plurality of customer RG/DM devices, and in turn, each BDT can support a number of USAMs. Thus, the USAM and BDT elements enjoy economies of scale as they are shared among many subscribers.

In the Central Office, each BDT is connected via a fiber optic cable to a router and aggregation device 40 arranged to further consolidate the data traffic from all subscribers within a single Central office. The aggregation device terminates the ATM signal generated at the RG/DM and further provides traffic shaping parameters to enhance system data throughput and performance optimization of the data streams. The aggregation device connects to the serving headend via optical cable 24 and carries all of the customer data traffic from the BDT's within the Central Office. A separate administration network 60, described in more detail below, carries all network monitoring and element provisioning data. Aggregation device 40 further separates the data traffic for the Pay-Per-View (PPV) network associated with the Video service, and the data service associated with a customer's computer(s).

In the aggregation device, each bit rate service is mapped to a range of virtual path identifiers/virtual channel identifiers (VPI/VCIs) (ATM layer) where each VPI/VCI range on the switch has a corresponding ATM contract for traffic shaping. This limits access traffic for transport efficiency, and allows the present invention to provide tiers of data service based on speed. Each bit rate service is mapped to a unique range of VPI/VCI's that are used for assignment to the customer's computers based upon the service to which the customer has subscribed. The actual assignment of specific IP addresses is performed at the headend. As seen in FIGS. 2 and 3, the headend includes a number of functional elements which have been individually shown for clarity. However, it will be understood that these elements can be integrated into one or more network elements depending upon factors such vendor product suite, network performance, service type, local content delivery, etc. The core elements of headend 14 perform high speed packet switching and routing functions. These elements are designed to provide connection to edge elements that provide access to various services. These services include local content, service provisioning and control functions, and gateway services to other networks.

Provisioning of a customer's service is performed by a network management system (NMS) server 52 and a Dynamic Host Address Protocol (DHCP) server 50. The DHCP server is integral in the assignment and management of IP addresses. The DHCP server issues either private or public IP addresses for the customer's computers as well as the RG's for the PPV network. Each of these networks are treated separately and are addressed out of different address pools. When private IP addresses are used for customer's computers they are typically translated in a Network Address Translator (NAT) for accessing resources in the public Internet.

The headend further provides the ability for Quality of Service (QOS) and Class of Service (COS) where this has been provisioned for the selected RG/DM. More specifically, the headend is able to actively provide for a particular level of signal quality based on the type of signals and services of a customer. COS allows the network to support different types of service to a customer, such as voice over IP. Additional features that are provided at the headend include service selection to allow or deny access to particular Internet or Intranet sites. Service selection also is used to direct a customer's data traffic to their subscriber Internet Service Provider (ISP).

The architecture also provides for localized content storage either at the headend, service provider Point-of-Presence (POP), or in the wire centers. This content can be delivered to each of the customers based upon QOS and COS selections providing guaranteed bandwidth delivery at the customer selected data rate.

More specifically, referring to FIG. 3, headend 14 includes a broadband management system 34 and NMS 52, which are preferably used to configure and provision the digital equipment and the ATM circuits. While only a single NMS is shown, an ATM switch 32 in the headend is configured by its own NMS. NMS 52 connects to broadband management system 34 via a suitable Ethernet switch 42. An edge router 44 provides a connection to a core router 46. In the preferred embodiment, a GUI-based network management system is provided for monitoring and controlling various elements (encoder, modulators, switches, etc.) of the digital data network. Other sets of servers can be connected to broadband management system 34 via Ethernet switch 42, such as DHCP server 50 for pay-per-view video and data services, a Web server, and a mail server generally shown in FIG. 2. A router 36 provides a suitable connection for administrative data to be sent and received via an Intranet or the Wide Area Network (WAN) connection of administrative network 60.

Data received from an ISP 16 is routed to a wide area network (WAN) router 48. The data is then selectively processed by either an edge router 54, or a PIX 56 and edge router 58 for address translation. The data is then processed by core router 46, and delivered over SONET multiplexers (not shown) to an access system located in a central office 12.

The present invention utilizes RFC 1483 on ATM over a SONET network. RFC 1483 is a standard set forth by the Internet Engineering Task Force (IETF) to establish methods for encapsulating other data protocols over an ATM virtual circuit. RFC 1483 allows an ATM virtual circuit to function as a bridge to transport link level protocols to a remote site. In addition, RFC 1483 permits routed protocols such as IP to be transported over an ATM virtual circuit.

Within the access system at the CO, one of a plurality of BDTs 26 maintain service and subscriber access information received from broadband management system 34. Router 36 facilitates connection through the administrative WAN network to a router 62 connected to Router/ATM Aggregation Device 40 and the BDT at the CO. In addition, an element management system 64 is provided in a separate Integrated Operations Center 66. Element management system 64 is similar in arrangement but not operation as the broadband management system 34. The element management system facilitates narrowband provisioning and narrowband and broadband alarm management. A router 68 provides a connection to broadband management system 34 via the administrative WAN to allow signaling to the BDTs in the CO. The BDT also maintains a two-way signaling channel with each RG and Ethernet switch (ES) connected at each end user location within a designated service area. This allows an RG/ES to register with the broadband management system. The BDT supports an SNMP interface with the broadband management system and the element management system for configuring and monitoring the network and drops.

Broadband management system 34 is arranged to configure and manage the access system in each CO, and RG/DM access to the available services. These functions enable network control over the delivery of data services. The broadband management system can communicate with the access system through a private corporate data network.

An external Billing/Subscriber Management System 70 shown in FIG. 1 is also provided to manage end user service accounts as well as RG/ES access to these services. The external billing system/subscriber management system forms a network operational support system. Other external network operational support systems 72, such as a network inventory tracking and management system, are shown in FIG. 3. The administrative architecture allows administrative data to be exchanged between the headend, operations center, and third party billing managers.

Referring now to the flow chart of FIG. 4, an IP address assignment arrangement is provided in accordance with another aspect of the present invention that utilizes both public and private IP addresses for a customer PC network. The allocation/assignment arrangement of the present invention advantageously recognizes the fact that many data end users do not run applications that use public IP addresses. Thus, the need to allocate required public IP addresses can be reduced. The IP address strategy of the present invention is designed to provide efficient utilization of IP addresses for three different networks. These are an Internal Management Network 80, a Residential Gateway Network 82, and a Customer PC Network 84.

For the Internal Management Network, Private IP addresses are statically assigned as denoted by block 100.

Regarding the Residential Gateway Network, this Network is used to address all of the RGs to enable Pay-Per- View. As an example, all RG/DMs are currently shipped from the factory with both a hard coded IP address of 10.0.x.y, where x.y is assigned by the provider, and DHCP client software. This allows the RG/DM to use a DHCP server for obtaining an address. The data system of the present invention is arranged to use a DHCP server for assigning private IP addresses for the RG in all cases as denoted at block 102.

A combination of public and private IP addresses are necessary to efficiently provide IP addresses for customer PCs, including the services of a leading Internet Service Provider (ISP). In accordance with the present invention, a default configuration for all PCs is to use DHCP assigned IP addresses. Addresses are assigned through the DHCP server located at the headend. IP addresses will be assigned from either private or public IP address pools depend upon the subscribed service. For example, as denoted at block 104, a public IP address is translated into a private IP address using NAT. The translation can be static, i.e., translation to an assigned private IP address (block 106), or dynamically translated for a limited time to an available IP address by the DHCP (block 108).

End users may use UDP applications may be incompatible with private IP addresses. For these end users, as shown at block 110, public IP addresses will be made available and assigned by a DHCP server. In addition, some end users will run applications that need public static IP addresses. These applications include servers, (e.g., Web, Email, FTP, etc.), and virtual private network extensions (VPNs). For these customers, public IP addresses are made available which will be statically assigned as indicated at block 112. Otherwise, leased public IP addresses are used at block 114.

Thus, the present invention provides the following advantages. A VDSL data network is provided that: (1) supports multiple service platforms with diverse content (i.e., video streaming, digital advertisements, videoconferencing, gaming, business-to-business service, E-commerce, video-on-demand, interactive TV, etc.); (2) supports two-way data services over high-speed fiber optics using SONET, Dense Wavelength Division Multiplexing, IP, ATM, and other transport systems; (3) provides a data architecture that supports multi-protocol over ATM using either Permanent Virtual Circuits or Switched Virtual Circuits, where the Vcs can be terminated locally at the wire center or remotely; (3) provides a VDSL platform that supports multiple data rates ranging from 56 kb/s and higher per customer; (4) provides a VDSL data network that supports intelligent appliances in the home through the use of home networks (i.e., coax, twisted pair, or wireless media); (5) provides a VDSL data architecture that encourages the use of home networking through the use of high-speed access and delivery; (6) provides a VDSL data platform capable of supporting small and large businesses and residential customers with very high-bandwidth multimedia interactive applications, as well as high-speed delivery of integrated services (symmetrical and asymmetrical) over twisted pair using VDSL technology; (7) provides a data architecture and network that supports Fiber-to-the-Node (FTTN), Fiber-to-the-Curb (or Neighborhood) (FTTC), and Fiber-to-the-Home (FTTH) using VDSL technology, and supports broadband switching using ATM PVC's and/or SVC's in a serving area, although switching can be performed at other locations in the network; (8) provides a VDSL data platform that supports very high-speed (>1 Gb/s) routing and switching at a headend location, thereby easily and efficiently enabling access to the Internet, intranets, or content hosting servers; and integration of data, video, and telephony services using VDSL technology over various mediums such as twisted pair copper, fiber optics, or wireless delivery; (9) provides a scaleable VDSL network architecture design that can grow to provide service to any number of customers for businesses, single family homes, and multiple dwelling units, and is flexible in supporting new customers on demand with the purpose of pre-provisioning the services ahead of time; (10) provides a VDSL platform that supports Quality of Service and Class of Service at either or both the IP and/or ATM layers, and can be easily managed in either a centralized or distributed environment; and (11) provides a functional and flexible VDSL data architecture for supporting streaming video and audio, voice over IP, and other uses for a data service delivery platform.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A scalable VDSL based broadband data communication network system comprising:
   a central office arranged to communicate with a plurality of end user personal computer (PC) terminals using ATM signals;
   a headend connected to an Internet service provider and the central office, wherein the headend is arranged to receive and send multi-protocol traffic signals to the Internet service provider, and receive and send ATM signals to the central office, the headend including a translation element arranged to translate a public IP address assigned to the VDSL network into a private network address assigned to a particular user PC terminal; and
   a DHCP server connected to the headend and arranged to dynamically assign IP addresses, the DHCP server assigning a private network IP address to network elements in the headend used to provide data services for the end user PCs and associated residential gateways or data modems.

2. The system of claim 1 wherein the DHCP server is arranged to assign a private network IP address to a residential gateway connected at an end user location to enable Pay-Per-View services.

3. The system of claim 1 wherein the headend further comprises a broadband management system, and the VDSL network further comprises an element manager system connected to the headend and the central office, the broadband management system and element manager system arranged to configure, provision, and monitor access elements located in the central office, as well as network connection devices connected at the end user location to control end user access to available services.

4. A method of assigning IP addresses to end user PCs in a VDSL based broadband communication network, said network comprising a headend connected to an Internet service provider, the method comprising:
   assigning a private network IP address to all network elements in the headend used to provide data services for the end user PCs and associated residential gateways connected to the VDSL network;
   assigning private network IP addresses to residential gateways to enable Pay-Per-View services;
   assigning to the end user PCs a private network IP address selected from a pool of private network IP addresses as a default procedure; and selectively assigning public IP addresses to end user PCs that can not be properly served using a private network IP address.

5. The method of claim 4 further comprising routing signals corresponding to a private IP address to a translation element located at the headend for translation of a public IP address into a private IP address assigned to a particular end user PC; and bypassing the translation element when routing signals not corresponding to a private IP address.

6. The method of claim 4 further comprising reserving a set of public IP addresses for manual assignment to end users in accordance with a lease agreement.

7. The method of claim 4 wherein selectively assigning public IP addresses comprises assigning public IP addresses to end users running a computer program that is incompatible with a private IP address.

8. A VDSL based broadband data communication network system capable of allowing selectable bit rate delivery to end users comprising:

a central office connected to communicate ATM signals to a plurality of end user personal computer (PC) terminals; and a headend connected to an Internet service provider and the central office, and arranged to receive and send multi-protocol traffic signals to the Internet service provider, and receive and send ATM signals to the central office, wherein the headend is further arranged to manage signal switching and routing based on a predetermined level of signal quality and transfer rate associated with a type of service provided to a particular end user, and wherein the head end is further arranged to support multi-protocol over ATM using either permanent virtual circuits or switched virtual circuits, where the virtual circuits can be terminated locally at a wire center or remotely from the wire center.

9. The system of claim 8 further comprising a Dynamic Host Address Protocol (DHCP) server connected to the headend and arranged to dynamically assign IP addresses.

10. The system of claim 8 wherein the DHCP server is arranged to assign a private IP address selected from a pool of private network IP addresses as a default procedure.

11. A VDSL based broadband data communication network system capable of allowing selectable bit rate delivery to end users comprising:

a central office connected to communicate ATM signals to a plurality of end user personal computer (PC) terminals;

a headend connected to an Internet service provider and the central office, and arranged to receive and send multi-protocol traffic signals to the Internet service provider, and receive and send ATM signals to the central office, wherein the headend is further arranged to manage signal switching and routing based on a predetermined level of signal quality and transfer rate associated with a type of service provided to a particular end user, the headend including a broadband management system; and an element manager system connected to the headend and the central office;

wherein the broadband management system and element manager system are arranged to configure, provision, and monitor access elements located in the central office, as well as network connection devices connected at the end user location to control end user access to available services.

12. The system of claim 11 wherein the broadband management system and element manager system support new end users on demand by pre-provisioning desired services.

13. The system of claim 8 wherein the head end is further arranged to support two-way data services over high-speed fiber optics.

14. The system of claim 13 wherein the head end is arranged to support two data services using at least one of SONET, Dense Wavelength Division Multiplexing, IP, or ATM.

15. A VDSL based broadband data communication network system capable of allowing selectable bit rate delivery to end users comprising:

a central office connected to communicate ATM signals to a plurality of end user personal computer (PC) terminals; and a headend connected to an Internet service provider and the central office, and arranged to receive and send multi-protocol traffic signals to the Internet service provider, and receive and send ATM signals to the central office, wherein the headend is further arranged to manage signal switching and routing based on a predetermined level of signal quality and transfer rate associated with a type of service provided to a particular end user and wherein the head end is further arranged to provide a VDSL data platform capable of supporting business and residential users with very high-bandwidth multimedia interactive applications, as well as high-speed delivery of integrated services over a twisted pair wiring plant.

16. The system of claim 8 wherein the head end provides a VDSL platform arranged to support Quality of Service and Class of Service at either or both an IP and/or ATM layer.

17. The system of claim 16 wherein the VDSL platform is arranged to manage the Quality of Service and Class of Service in either a centralized or distributed environment.

18. A VDSL based broadband data communication network system capable of allowing selectable bit rate delivery to end users comprising:

a central office connected to communicate ATM signals to a plurality of end user personal computer (PC) terminals; and a headend connected to an Internet service provider and the central office, and arranged to receive and send multi-protocol traffic signals to the Internet service provider, and receive and send ATM signals to the central office, wherein the headend is further arranged to manage signal switching and routing based on a predetermined level of signal quality and transfer rate associated with a type of service provided to a particular end user;

wherein a VDSL platform is provided having a flexible VDSL data architecture for supporting streaming of video and audio, and voice over IP.

* * * * *